United States Patent Office 2,711,414
Patented June 21, 1955

2,711,414

ACETYLATION OF THIOPHENE COMPOUNDS

Ted R. Norton, Concord, Calif., assignor to The Dow Chemical Company, Midland, Mich., a corporation of Delaware No Drawing. Application September 7, 1951, Serial No. 245,628

8 Claims. (Cl. 260—332.3)

This invention concerns an improved method and certain catalysts for reacting acetic anhydride with thiophene, and with alkylated thiophenes which are unsubstituted in the 2-position of the thiophene nucleus, to form acetylated derivatives thereof.

It is known that thiophene may be acylated by reaction with organic carboxylic acid anhydrides or corresponding acyl halides in the presence of catalysts, and that the results obtained vary widely depending upon the reaction conditions, particularly the kind and proportion of catalyst, employed. A variety of catalysts, e. g. aluminum chloride, stannic chloride, phosphorus pentoxide, iodine, zinc chloride, sulphuric acid, phosphoric acid, acid-activated bleaching earth, glaucinite, and dihydroxy fluoboric acid, etc., have been disclosed as effective in such reactions. In most, if not all, instances, the known methods for the acylation of thiophene involve one or more disadvantages, such as formation of the desired product in low yield and often accompanied by large amounts of tarry by-products, a requirement that the catalyst be used in large proportion relative to the amounts of materials to be reacted, occurrence of rapid deactivation or poisoning of the catalyst rendering it unsuitable for further use in the process, and occurrence of the acylation reaction at a low rate, etc.

It has now been found that the finely divided, water-insoluble, nuclear sulphonated copolymers of monovinyl- and polyvinyl-aromatic hydrocarbons, such as are disclosed as cation exchange materials in U. S. Patent No. 2,366,007, are exceptionally effective as catalysts for the reaction of acetic anhydride with thiophene, and with alkylated thiophenes which are unsubstituted in the 2-position of the thiophene nucleus, to form corresponding acetylated thiophene compounds. Such catalysts are effective, even when employed in small proportion, in causing the acetylation to occur rapidly at moderately elevated temperatures to form the acetylated thiophene derivative in high yield and in a readily purifiable form. After completing the reaction, the catalyst can be removed by filtering or decanting the mixture and the product be purified by distillation. The recovered catalyst can usually be re-employed one or more times before becoming deactivated to a point where it is no longer suitable for use in the reaction. By-product formation is low when employing such catalysts.

Peculiarly, the above-mentioned sulphonated copolymers of monovinyl- and polyvinyl-aromatic hydrocarbons, although exceptionally effective as catalysts for the reaction of acetic anhydride with thiophene and simple derivatives thereof, appear to be specific to such a reaction. They have been found to be inactive, or of low activity, when tested as catalysts for other acylation reactions involving thiophene. For instance, such a sulphonated copolymer failed to cause a reaction of propionic anhydride with thiophene under conditions similar to those at which the same catalyst causes rapid and nearly complete reaction of acetic anhydride with thiophene. It caused formation of 2-acetylthiophene in low yield, i. e. a less than 15 per cent yield, when tested under otherwise similar conditions as a catalyst for the reaction of acetyl chloride with thiophene. The reason why the above-mentioned sulphonated copolymers are specific as catalysts for the reaction of acetic anhydride with thiophene and simple derivatives thereof is not known, but it is probable that the sulphonated copolymer catalysts are not poisoned, i. e. deactivated, to a great extent during use in such reactions, but are rapidly poisoned when tested for the reaction of thiophene with other acylating agents.

The above-mentioned sulphonated copolymers of monovinyl- and polyvinyl-aromatic hydrocarbons have been found to be far more effective than other cation exchange materials as catalysts for the reaction of acetic anhydride with thiophene. For instance, a sulphonated phenolformaldehyde resin caused formation of 2-acetylthiophene in a less than 5 per cent yield, and a carboxylated phenolformaldehyde resin failed to cause any reaction, when tested as catalysts for the reaction of acetic anhydride with thiophene under conditions similar to those at which the sulphonated copolymers of the invention are highly effective in promoting the reaction.

Any of the nuclear sulphonated copolymers of monovinyl- and polyvinyl-aromatic compounds which are adapted for use as ion exchange agents, i. e. which are insoluble in water and in aqueous solutions of acids or alkalies, may be used as catalysts in the process of the invention. D'Alelio, in the aforementioned U. S. Patent No. 2,366,007, discloses a number of such sulphonated copolymers and describes the preparation of the same. Copolymers of styrene with from 1 to 20 per cent by weight of divinylbenzene and copolymers of styrene, ar-ethylvinylbenzene and from 1 to 20 per cent by weight of divinylbenzene may be sulphonated, e. g. by reaction with concentrated sulphuric acid, fuming sulphuric acid, or chlorosulphonic acid, to obtain sulphonated copolymer products which are well suited for use in the process. In most instances, the sulphonation is carried to a point at which the sulphonated copolymer contains an average of about one sulphonic acid radical per aromatic nucleus, but the product may be of lower or somewhat higher sulphonic acid radical content, e. g. it may contain an average of 0.5 or more sulphonic acid radical per aromatic nucleus.

The catalytic activity of the above-mentioned sulphonated copolymers, i. e. the proportion of such sulphonated copolymer required to cause the acetylation of thiophene at a given rate, varies with change in the particle size, and therefore the surface-area, of the sulphonated copolymer granules. Accordingly, although the sulphonated copolymer granules may be of any desired size, such material is most effective when in the form of small particles, e. g. capable of passing a 100 mesh, and preferably capable of passing through a 200 mesh, Tyler screen. The sulphonated copolymer particles of a given mesh size are more active catalytically when they have been brought to the desired particle size by a crushing or girnding operation than when prepared directly as rounded particles or granules. This, presumably, is because a crushed granule is of irregular shape and possesses a greater surface-area than that of a rounded granule of the same mesh size. Apparently, the catalytic action of the sulphonated copolymer granules occurs principally at the outer surfaces thereof, rather than throughout the granules.

It is the acid form of the sulphonated copolymers which is highly effective as a catalyst in the process. It is not necessary, however, that the sulphonated copolymer be entirely in its acid form when employed as a catalyst, i. e. a sulphonated copolymer which has been only partially converted to its acid form from a salt form of the same may be used as the catalyst.

The minimum proportion of the catalyst required to cause a rapid reaction of acetic anhydride with thiophene varies with changes in the sulphonic acid radical content of the catalyst, the particlue size of the catalyst and the shape of the catalyst particles. When using the crushed or ground sulphonated copolymer in a finely divided form capable of passing through a 200 mesh Tyler screen, as little as 0.4 gram of catalyst per gram mole of the acetic anhydride reactant has been found sufficient to permit a fairly rapid reaction of the acetic anhydride with thiophene to form 2-acetylthiophenone in appreciable yield, and as little as 0.1 gram of the catalyst per gram mole of the acetic anhydride caused the reaction to occur slowly, but at an appreciable rate. However, it has been observed that the yields of 2-acetylthiophene are somewhat higher when the reaction is carried out rapidly than when carried out slowly but over a longer period of time. For this reason, it is preferable that the catalyst be used in amount sufficient to cause a rapid reaction. In practice, 1 gram or more, e. g. from 1 to 5 grams, of the finely divided catalyst is usually employed per gram mole of the acetic anhydride. The catalyst may, of course, be used in much larger proportions, e. g. as large as desired.

The catalytic acetylation of thiophene and simple derivatives thereof is carried out, preferably under reflux, at reaction temperatures of 75° C. or above, usually at temperatures of between 80° and 125° C., but it may be carried out under pressure, i. e. in a closed vessel, at higher temperatures. Also, the reaction is usually carried out in the absence of liquid solvents or diluents other than the reactants themselves, but an inert liquid diluent, e. g. acetice acid, may be used as a reaction medium if desired.

The reactants may be used in any desired proportions, but, under otherwise similar conditions, the reaction occurs more rapidly and favorably when either of the reactants, particularly the thiophene, is used in a molecular excess over the other than when the reactants are used in equimolecular proportions. Usually, from 1.2 to 3 gram molecular equivalents or more of thiophene is employed as a starting material per mole of the acetic anhydride.

The reactants and catalyst may be admixed with one another in any desired order. For instance, they may be mixed at room temperature and the entire mixture be heated to the reaction temperature, or a mixture of the thiophene and catalyst may be added with stirring to the heated acetic anhydride, etc.

When operating under the preferred conditions set forth above, the reaction may be carried nearly to completion in less than two minutes, but in practice the mixture is usually stirred and heated for a longer time, e. g. from 15 to 30 minutes or more, so as to assure substantially complete reaction. The catalyst is then removed, e. g. by filtration, and the reaction liquor is distilled to separate the acetylated product and to recover any unreacted thiophene or acetic anhydride. The recovered thiophene or acetic anhydride may be returned to the reaction.

The process may be carried out batchwise, as just described, or in a continuous manner. The process may be carried out continuously by passing a suspension of the catalyst in the reactants through a reaction zone where it is heated at the reaction temperature, e. g. for from 2 to 10 minutes. The mixture flowing from the zone is filtered to remove the catalyst and fractionally distilled to separate the product and recover unreacted starting materials.

The process may be applied in reacting acetic anhydride with thiophene, or with any nuclear alkylated thiophene which is unsubstituted in the 2-position of the nucleus, e. g. with a 5-alkylthiophene, to form a corresponding acetylated thiophene derivative. For instance, it may be applied in acetylating thiophene to form 2-acetylthiophene, in acetylating 5-ethylthiophene to obtain 2-acetyl-5-ethylthiophene, in acetylating 5-isopropylthiophene to obtain 2-acetyl-5-isopropylthiophene, and in acetylating 5-tertiarybutylthiophene to obtain 2-acetyl-5-tertiary-butylthiophene, etc.

The following examples describe certain ways in which the invention has been practiced, but are not to be construed as limiting its scope.

EXAMPLE 1

In each of three experiments a mixture of 51 grams (0.5 mole) of acetic anhydride, 126 grams (1.5 moles) of thiophene and a minor amount of a finely ground, sulphonated copolymer of styrene, ar-ethylvinylbenzene and divinylbenzene was stirred and heated at 96° C. under reflux for 15 minutes. The sulphonated copolymer was one prepared by sulphonation of a copolymer of about 84 per cent by weight styrene, about 8 per cent ar-ethylvinylbenzene and about 8 per cent divinylbenzene. It contained an average of approximately one sulphonic acid radical per aromatic nucleus. The sulphonated copolymer was employed in its acid form. The amounts of the sulphonated copolymer used in the three experiments were 0.05 gram, 0.2 gram and 0.5 gram, respectively. After each mixture had been heated at 96° C. for 15 minutes, it was cooled, filtered to remove the catalyst, and the filtrate was fractionally distilled to recover unreacted thiophene and to separate the 2-acetylthiophene product. The amount of thiophene not recovered as such was assumed to have been consumed. The "conversion" of starting materials in each experiment is calculated by dividing the gram molecular equivalents of thiophene consumed in the reaction by the gram molecular equivalents of acetic anhydride employed as a starting material. The per cent yield on consumed material is obtained by dividing the gram molecular equivalents of 2-acetylthiophene by the gram molecular equivalents of thiophene consumed in the reaction and multiplying by 100. The per cent efficiency obtained in each experiment is the arithmetical product of the conversion and the per cent yield. The following table gives the grams of catalyst employed in each experiment and the per cent efficiency of the reaction in said experiment.

Table I

| Run No. | Gms. of Catalyst | Percent Efficiency |
| --- | --- | --- |
| 1 | 0.05 | 9.5 |
| 2 | 0.20 | 48.6 |
| 3 | 0.50 | 85.2 |

EXAMPLE 2

In each of another series of experiments, a mixture of 0.5 gram of a sulphonated copolymer catalyst and acetic anhydride and thiophene in the amounts given in Table II was stirred and boiled under reflux for 30 minutes. The catalyst was of the kind and quality described in Example 1. At the end of the 30 minutes of heating, the mixture was cooled and filtered. The filtrate was fractionally distilled to recover unreacted starting materials and acetic acid formed in the reaction and to separate the 2-acetylthiophene product. The amount of higher boiling by-products was determined by weighing the residue which remained after the 2-acetylthiophene had been distilled. The conversion, per cent yield and per cent efficiency values for each experiment were calculated as in Example 1, except that the conversion was obtained by dividing the gram moles of consumed thiophene by the gram molecular equivalents of the reactant (i. e. thiophene or acetic anhydride) which was used in lesser amount in the starting mixture. Table II gives the gram molecular equivalents of acetic anhydride and thiophene employed as starting materials, the conversion obtained, the per cent yield of 2-acetylthiophene, and the per cent efficiency for each experiment. It also gives the grams of high boiling by-products, i. e. still residue, obtained in each experiment.

Table II

| Run No. | Gm. Moles of— | | Conversion | Percent Yield | Percent Efficiency | Gms. of Residue |
|---|---|---|---|---|---|---|
| | Acetic Anhydride | Thiophene | | | | |
| 1 | 2 | 0.5 | 85.7 | 95.9 | 82.1 | 1.1 |
| 2 | 1 | 0.5 | 89.0 | 94.6 | 84.2 | 0.8 |
| 3 | 0.5 | 0.5 | 83.6 | 92.6 | 77.5 | 0.4 |
| 4 | 0.5 | 0.75 | 99.0 | 92.0 | 91.0 | 0.5 |
| 5 | 0.5 | 1.0 | 100 | 94.6 | 94.6 | 0.8 |
| 6 | 0.5 | 1.5 | 100 | 95.3 | 95.3 | 0.5 |

It will be noted that the yield of 2-acetylthiophene is higher and the efficiency of the process greater when either of the reactants is used in molecular excess over the other, and that these improvements are greatest when it is the thiophene which is used in excess. It will also be noted that by-products are formed in only small amount in practice of the invention and that the amount of high boiling by-products, i. e. tarry still residue, is particularly small.

EXAMPLE 3

In each of two experiments, a mixture of 0.5 gram molecular equivalent of acetic anhydride, 1.5 gram moles of thiophene, and 4 grams of a finely divided sulphonated copolymer having approximately the composition of that described in Example 1 was boiled under reflux for 4.5 hours. The mixture was then cooled, filtered and the filtrate was distilled to recover unreacted materials and separate the 2-acetylthiophene product. The experiments differed from one another in that the sulphonated copolymer employed as a catalyst in one experiment was material which had been prepared directly as rounded particles of from 250 to 500 mesh size whereas the sulphonated copolymer used in the other experiment consisted of irregular shaped particles capable of passing a 20 mesh screen, which particles had been formed by grinding coarser material. Table III identifies each experiment by indicating whether the catalyst was in the form of rounded particles or irregular shaped particles and gives the per cent efficiency obtained in each experiment.

Table III

| Run No. | Form of Catalyst Particles | Percent Efficiency |
|---|---|---|
| 1 | Rounded | 45.6 |
| 2 | Irregular shaped | 76.4 |

It will be evident from the table that in order to obtain a given rate of reaction, a catalyst in the form of rounded particles must be used in larger proportion than is required when the catalyst is in the form of irregular shaped particles of the same particles size.

EXAMPLE 4

A mixture of 28 grams (0.2 mole) of 5-(tertiary-butyl) thiophene, 21 grams (0.2 mole) of acetic anhydride and 0.5 gram of the finely ground sulphonated copolymer described in Example 1, was stirred and heated under reflux at temperatures of from 90° to 120° C. for 30 minutes. The mixture was then filtered and the filtrate was fractionally distilled. In the distillation, 10.9 grams (0.0778 mole) of unreacted 5-(tertiary-butyl) thiophene was recovered and there was obtained, as a separate fraction of the distillate, 107.2 grams (0.586 mole) of 2-acetyl-5-(tertiary-butyl) thiophene. The yield of 2-acetyl-5-(tertiary-butyl) thiophene was approximately 96 per cent of theoretical, based on the amount of 5-(tertiary-butyl) thiophene consumed in the reaction.

Other modes of applying the principle of the invention may be employed instead of those explained, change being made as regards the method herein disclosed, provided the step or steps stated by any of the following claims, or the equivalent of such stated step or steps be employed.

I therefore particularly point out and claim as my invention:

1. In a method wherein a thiophene compound, of the group consisting of thiophene and lower alkyl thiophenes containing the alkyl radical as a substituent in the 5-position of the thiophene nucleus, is acetylated by reacting the same with acetic anhydride, the improvement of carrying out the reaction in contact with a finely divided, nuclear sulfonated copolymer of monovinyl- and polyvinyl-aromatic hydrocarbons as a catalyst for the reaction.

2. In a method wherein a thiophene compound, of the group consisting of thiophene and lower alkyl thiophenes containing the alkyl radical as a substituent in the 5-position of the thiophene nucleus, is acetylated by reacting the same with acetic anhydride at a reaction temperature between 75° and 125° C., the improvement of carrying out the reaction in contact with finely divided, nuclear sulfonated copolymer of monovinyl- and polyvinyl-aromatic hydrocarbons as a catalyst while agitating the mixture to cause dispersion of the catalyst in the mixture.

3. In a method wherein a lower alkyl thiophene, having the alkyl radical as a substituent in the 5-position of the thiophene nucleus, is acetylated by reacting the same with acetic anhydride at a temperature between 75° and 125° C., the improvement of carrying out the reaction in contact with a finely divided, nuclear sulphonated copolymer of monovinyl- and polyvinyl-aromatic hydrocarbons as a catalyst for the reaction.

4. In a method wherein 5-(tertiary-butyl) thiophene is acetylated by reacting the same with acetic anhydride at temperatures between 75° and 125° C., the improvement of carrying out the reaction in contact with a finely divided, nuclear sulfonated copolymer of monovinyl- and polyvinyl-aromatic hydrocarbons as a catalyst for the reaction, said catalyst being present in the reaction mixture and the latter being stirred during the reaction.

5. In a method of making 2-acetylthiophene wherein thiophene is acetylated by reacting the same with acetic anhydride, the improvements of carrying out the reaction by heating a mixture of thiophene, acetic anhydride and a minor amount of a finely divided nuclear sulphonated copolymer of a major amount of at least one monovinyl aromatic hydrocarbon and a minor amount of divinylbenzene at reaction temperatures between 75° and 125° C., thereafter removing the sulphonated copolymer from the mixture and fractionally distilling the remaining mixture to separate the 2-acetylthiophene product.

6. In a method of making 2-acetylthiophene wherein thiophene is acetylated by reacting the same with acetic anhydride, the improvements of carrying out the reaction by agitating and heating a mixture of thiophene, acetic anhydride and a minor amount of a finely-divided nuclear sulphonated copolymer of a major amount of styrene and minor amounts of ar-ethylvinylbenzene and divinylbenzene, which copolymer is in the form if irregular shaped particles, at reaction temperatures between 75° and 125° C., thereafter filtering the mixture to remove the sulphonated copolymer, and fractionally distilling the filtrate to separate the 2-acetylthiophene product.

7. In a method of making 2-acetyl-5-(tertiary-butyl) thiophene wherein 5-(tertiary-butyl) thiophene is acetylated by reacting the same with acetic anhydride, the improvements of carrying out the reaction by heating a mixture of 5-(tertiary-butyl) thiophene, acetic anhydride, and a minor amount of a finely divided nuclear sulphonated copolymer of a major amount of at least one monovinyl aromatic hydrocarbon and a minor amount of divinylbenzene at reaction temperatures between 75° and 125° C., thereafter removing the sulphonated copolymer from the mixture, and fractionally distilling the remaining mixture to separate the 2-acetyl-5-(tertiary-butyl) thiophene product.

8. In a method of making 2-acetyl-5-(tertiary-butyl) thiophene wherein 5-(tertiary-butyl) thiophene is acetylated by reacting the same with acetic anhydride, the improvements of carrying out the reaction by heating a mixture of 5-(tertiary-butyl) thiophene, acetic anhydride and a minor amount of a finely divided nuclear sulphonated copolymer of a major amount of styrene and minor amounts of ar-ethylvinylbenzene and divinylbenzene, which copolymer is in the form of irregular shaped particles such as are formed by grinding and crushing operations, at reaction temperatures between 75° and 125° C., thereafter filtering the mixture to remove the sulphonated copolymer, and fractionally distilling the filtrate to separate the 2-acetyl-5-(tertiary-butyl) thiophene product.

References Cited in the file of this patent

UNITED STATES PATENTS 2,432,991   Hartough et al. _____ Dec. 23, 1947

OTHER REFERENCES

Thomas et al.: "Nature," 159:372 (1947).
Nachod: "Ion Exchange," pp. 261–273, Academic Press Inc., N. Y., 1949.
Emerson et al.: J. Org. Chem. 13, pp. 722–28 (1948).